(12) United States Patent
Ninkov (10) Patent No.: US 7,411,005 B2
(45) Date of Patent: *Aug. 12, 2008

(54) COMPOSITIONS AND METHODS FOR INCREASING MILK PRODUCTION IN ANIMALS

(75) Inventor: Dusan Ninkov, San Diego, CA (US)

(73) Assignee: Van Beek Natural Science, LLC, Orange City, IA (US)

( * ) Notice: Subject to any disclaimer, the term of this patent is extended or adjusted under 35 U.S.C. 154(b) by 906 days.

This patent is subject to a terminal disclaimer.

(21) Appl. No.: 10/366,634

(22) Filed: Feb. 12, 2003
(Under 37 CFR 1.47)

(65) Prior Publication Data

US 2003/0212146 A1    Nov. 13, 2003

Related U.S. Application Data

(60) Provisional application No. 60/356,846, filed on Feb. 13, 2002.

(51) Int. Cl.
*A01N 31/08*    (2006.01)
*A61K 31/05*    (2006.01)
*A23B 7/10*    (2006.01)

(52) U.S. Cl. .................. 514/736; 514/669; 514/731

(58) Field of Classification Search .............. 514/731, 514/736; 424/725, 442; 426/54; 532/589
See application file for complete search history.

(56) References Cited

U.S. PATENT DOCUMENTS

| | | | |
|---|---|---|---|
| 2,360,269 A * | 10/1944 | Partansky | 514/736 |
| 3,966,779 A | 6/1976 | Satzinger et al. | |
| 3,988,487 A | 10/1976 | Sanderson et al. | |
| 4,130,638 A | 12/1978 | Dhabhar et al. | |
| 4,380,506 A | 4/1983 | Kimura et al. | |
| 4,704,276 A | 11/1987 | Kantor | |
| 4,857,332 A | 8/1989 | Schricker | |
| 4,985,465 A | 1/1991 | Hendler | |
| 4,992,276 A | 2/1991 | Dills et al. | |
| 5,061,491 A | 10/1991 | Deryabin | |
| 5,158,774 A | 10/1992 | Inman | |
| 5,496,571 A | 3/1996 | Blagdon et al. | |
| 5,565,211 A | 10/1996 | Rossi | |
| 5,733,530 A | 3/1998 | Bacca et al. | |
| 5,801,153 A | 9/1998 | Badaway | |
| 5,861,144 A * | 1/1999 | Peterson et al. | 424/65 |
| 5,871,757 A | 2/1999 | Cloughley et al. | |
| 5,891,422 A | 4/1999 | Pan et al. | |
| 5,955,086 A | 9/1999 | DeLuca et al. | |
| 5,965,518 A | 10/1999 | Nakatsu et al. | |
| 5,980,903 A | 11/1999 | Pruthi et al. | |
| 5,990,178 A * | 11/1999 | Ninkov | 514/731 |
| 6,010,993 A | 1/2000 | Romano et al. | |
| 6,043,276 A | 3/2000 | Han et al. | |
| 6,048,869 A * | 4/2000 | Von Langen et al. | 514/290 |
| 6,106,838 A | 8/2000 | Nitsas | |
| 6,203,796 B1 | 3/2001 | Papaprodromou | |
| 6,254,883 B1 * | 7/2001 | Jarnstrom et al. | 424/449 |
| 6,414,036 B1 * | 7/2002 | Ninkov | 514/731 |
| 6,649,660 B2 * | 11/2003 | Ninkov | 514/731 |

FOREIGN PATENT DOCUMENTS

| | | |
|---|---|---|
| DE | 1692045 A | 5/1971 |
| DE | 3511862 C | 10/1986 |
| EP | 0 424 534 A1 | 5/1991 |
| EP | 0 904 780 A1 | 3/1999 |
| FR | 2467601 A | 5/1981 |
| FR | 2616327 A | 12/1988 |
| FR | 2618670 A | 2/1989 |

(Continued)

OTHER PUBLICATIONS

Masterton, William L. and Stowinski, Emil J. "Chemical Principles, 3rd ed." 1993 W.B. Saunders Co. Pub.; p. 312, 380.*

(Continued)

*Primary Examiner*—Ardin Marschel
*Assistant Examiner*—Amy A Lewis
(74) *Attorney, Agent, or Firm*—McKee, Voorhees & Sease, P.L.C.

(57) ABSTRACT

The invention provides A composition for increasing milk production in an animal that includes an active compound chosen from calcium isopropyl cresol, calcium isopropyl-o-cresol, lactic acid, or combinations thereof, and calcium carbonate as a buffering agent. The invention also provides a composition for increasing milk production in an animal that includes about 0.1 wt % to about 15 wt % of the total weight of the composition of active compound, wherein the active compound is chosen from calcium isopropyl cresol, calcium isopropyl-o-cresol, and lactic acid, about 40 wt % to about 75 wt % of the total weight of the composition of calcium carbonate, and about 10 wt % to about 60 wt % of the total weight of the composition of at least one carrier. The invention also provides a method for increasing milk production in an animal that includes making a composition having an active compound chosen from calcium isopropyl cresol, calcium isopropyl-o-cresol, lactic acid, or combinations thereof, and calcium carbonate as a buffering agent, and feeding the composition to the animal, wherein consumption of the composition increases milk production in the animal.

28 Claims, 1 Drawing Sheet

FOREIGN PATENT DOCUMENTS

| | | | |
|---|---|---|---|
| FR | 2625677 | A | 7/1989 |
| FR | 2706770 | A | 12/1994 |
| FR | 2715848 | A | 8/1995 |
| GB | 916439 | | 1/1963 |
| JP | 53-66420 | | 6/1978 |
| JP | 57056416 | A | 4/1982 |
| JP | 59029620 | A | 2/1984 |
| JP | 4063579 | A | 2/1992 |
| JP | 4278070 | A | 10/1992 |
| JP | 7267873 | A | 10/1995 |
| JP | 8020510 | A | 1/1996 |
| KR | 9402650 | B | 3/1994 |
| RO | 80355 | A | 11/1982 |
| RO | 108766 | B | 8/1994 |
| RU | 2007177 | C | 2/1994 |
| RU | 2008013 | C | 2/1994 |
| RU | 2013094 | C | 5/1994 |
| SU | 1796188 | A | 2/1993 |
| SU | 1837887 | A | 8/1993 |
| WO | WO 96/37210 | | 11/1996 |
| WO | WO 97/01348 | | 1/1997 |
| WO | WO 01/15680 | A1 | 3/2001 |

OTHER PUBLICATIONS

Molds and Mycotoxins Newsletter [online], May 2001; retrieved on Jan. 16, 2005 from the internet <http://www.selectsires.com/microbials.html>.*

Select Series, Inc. Nutritional Supplements, DTX select [online]; retrieved on Jan. 16, 2005 from the internet <http://www.allwestselectsires.com/don05.asp>.*

Fell, J., "Targeting of drugs and delivery systems to specific sites in the gastrointestinal tract," *Journal of Anatomy*, vol. 189, Part 3, pp. 517-519 (Dec. 1996).

Ondarza, M. et al., "Steam Distillation and Supercritical Fluid Extraction of Some Mexican Spices," *Chromatographia*, vol. 30, No. 1/2, pp. 4 and 16-18 (Jul. 1990).

The Merck Index, Twelfth Edition, p. 308 ("Carvacrol") and p. 1604 ("Thymine"), date unknown.

* cited by examiner

Fig. 1

COMPOSITIONS AND METHODS FOR INCREASING MILK PRODUCTION IN ANIMALS

This application claims priority of invention under 35 U.S.C. § 119(e) from U.S. Provisional Application No. 60/356,846 filed on Feb. 13, 2002.

FIELD OF THE INVENTION

The invention generally relates to compositions and methods of increasing the milk production in animals, and more specifically to compositions that include calcium carbonate and organic phenolic compounds, and uses thereof.

BACKGROUND OF THE INVENTION

Modern agricultural practices indicate that the most important aspect of the milking industry is the feeding of the milking animals. It is generally thought that correct feeding methods will provide a good basis for economic milk production. Correct feeding methods require a properly balanced feed and a high quality feed. However, even if these factors are addressed, issues can arise which may impair the feeding of the animals. Some of these issues include coping with heat stress and timely breed back.

Often, these issues are addressed through the use of synthetic chemicals or hormones. U.S. Pat. No. 5,565,211 (Rossi) discloses a composition designed for improving the digestibility of feed for ruminants that contains an aromatic phenol derivative, an absorbing support, and an aromatizing mixture. U.S. Pat. No. 5,496,571 (Blagdon et al.) discloses a method for increasing the production of milk in ruminants that includes oral administration of an increasing amount of encapsulated choline. U.S. Pat. No. 4,704,276 (Kantor) discloses a method for increasing lactation in lactating ruminants that includes the administration of antibiotics. U.S. Pat. No. 4,857,332 (Schricker) discloses a composition for increasing milk fat production in ruminants that includes sodium and magnesium antacids, an electrolyte, and sodium bicarbonate.

However, there still remains a need for methods of increasing milk production, especially those that do not utilize synthetic chemicals or hormones.

SUMMARY OF THE INVENTION

The invention provides compositions that include at least one active compound and at least one buffering agent. Active compounds used in compositions of the invention include an organic phenolic compound combined with a Group II salt, and lactic acid. In particular, the organic phenolic compounds include isopropyl-o-cresol (5-isopropyl-2-methylphenol, or carvacrol) and/or isopropyl-cresol (5-methyl-2[1-methylethyl]phenol, or thymol). The organic phenolic compound can be obtained from plant oil extracts or synthesized by known methods. The Group II salts include a cation from Group II of the periodic table and an anion, in one embodiment, calcium carbonate. In another embodiment, the organic phenolic compound is combined with a Group II salt to form a reacted compound. Compositions of the invention also include buffering agents which function to buffer the stomach or stomachs of the animals.

DETAILED DESCRIPTION OF THE INVENTION

Compositions of the invention are used for increasing milk production in animals. The compositions may also increase the appetite and enhance the general health of the animal. Compositions of the invention can be administered to any milk producing animals including those which are used for production of consumable milk, such as cows, goats, and sheep, and those which produce milk for their young such as mares, and sows. Compositions of the invention may also function to preserve and maintain the quality of feed by reducing or minimizing bacterial growth, such as fungus and yeasts for example, in the feed.

Because the active compounds of the invention are degraded by enzymes, the compositions are particularly well suited for livestock. Little residue from the active compound is found in products from treated livestock, such as milk, eggs, and meat. Organic phenolic compounds such as isopropyl-o-cresol and isopropyl-cresol are degraded by enzymes into inactive metabolites. The metabolites can be excreted in the urine (approx. 90%) or expired from the lungs (10%) in the form of $CO_2$. Additional information on the degradation of isopropyl-o-cresol and isopropyl-cresol, can be found in US Pharmacopoeia, British and European Pharmacopoeia, and *Textbook of Veterinary Physiology*, by Prof. Dr. James G. Cunningham, Ph.D., 2nd edition. The text of all three references is hereby incorporated by reference herein. Additionally, active compounds of the invention do not appear to be mutagenic or carcinogenic.

It is believed, but not relied upon, that the active compounds of the invention function as a bactericide. As a bactericide, the active compounds change the makeup of the flora in the rumen and the intestines. Furthermore, aromatic polyphenolic compounds, which may be present when the organic phenolic compounds are extracted from the Lamiaceae, or Verbenaceae families, may stimulate receptors for the production of enzymes causing an increase in appetite and an enhanced metabolism.

Compositions of the invention include at least one active compound and at least one buffering agent. Compositions of the invention may, but need not, include one or more carriers.

I. Active Compounds

As used herein, the term "active compound" refers to compounds formed by reacting an organic phenolic compound with a Group II salt, lactic acid, or combinations thereof.

A. Organic Phenolic Active Compounds

1. Organic Phenolic Compounds

In one embodiment of the invention, the active compound includes an organic phenolic compound such as isopropyl-o-cresol (5-isopropyl-2-methylphenol, or carvacrol) or isopropyl-cresol (5-methyl-2[1-methylethyl]phenol, or thymol).

Isopropyl cresol      Isopropyl-o-cresol

Isopropyl-o-cresol is a crystal with a boiling point of about 233° C. at atmospheric pressure. Isopropyl-cresol is a liquid that has a boiling point at atmospheric pressure of 237-238° C. Both compounds volatilize in water vapor.

Organic phenolic compounds, for use in the invention, can be made synthetically by known methods, or can be obtained from a plant oil extract. In one embodiment, the organic phenolic compounds are obtained from a plant oil extract.

In an embodiment of the invention wherein the organic phenolic compounds are obtained from plant oil extracts, the plant is a member of the Lamiales order. In another embodiment, the plant is a member of the Lamiacea (also called Labiatae) or Verbenaceae families of the order Lamiales, or combinations thereof. Plants in the Lamiaceae and Verbenaceae families include hybrids of plants produced from individual plants in one or a combination of those families.

The common name for members of the Lamiaceae family, a large family of mostly annual or perennial herbs, is the "mint family". The mint family is classified in the division Magnoliphyta, class Magnoliopsida, and order Lamiales. The Lamiaceae family includes about 200 genera, such as Salvia, Rosmarinus, Mentha, Ocimum, Thymus, Marrubium, Monarda, Trichostema, Teucrium, Hyptis, Physostegia, Lamium, Stachys, Scutellaria, Nepeta and Lycopus.

The common name for members of the Verbenacea family is the Verbena family. The Verbena family is also classified in the division Magnoliphyta, class Magnoliopsida, and order Lamiales. The Verbenacea family includes about 30 genera, such as Verbena, Lippia, and Clerodendrum.

In one embodiment, plants which are used for extraction of organic phenolic compounds include, but are not limited to, *Ocimum spp., Saturea spp., Monarda spp, Origanum spp., Thymus spp., Mentha spp., Nepeta spp., Teucrium gnaphalodes, Teucrium polium, Teucrim divaricatum, Teucrim kotschyanum, Micromeria myrifolia, Calamintha nepela, Rosmarinus officinalis, Myrtus communis, Acinos suaveolens, Dictamnus albus, Micromeria fruticosa, Cunila origanoides, Mosla Japonoica Maxymowitz, Pycnanthemum nudum, Micromeria Juliana, Piper betel, Trachyspermum ammi, Lippia graveolens, Escholtia splendens, Lippia Graveolens* and *Cedrelopsis grevei*, as well as others.

In one embodiment of a composition of the invention, the oil is extracted from *Esholtia splendens, Cedrelopsis grevei, Lippia graveolens* or a plant of the species Nepeta, including but not limited to *Nepeta racemosa* (catmint), *Nepeta citriodora, Nepeta elliptica, Nepeta hindostoma, Nepeta lanceolata, Nepeta leucophylla, Nepeta longiobracteata, Nepeta mussinii, Nepeta nepetella, Nepeta sibthorpii, Nepeta subsessilis* and *Nepeta tuberosa*.

In another embodiment of a composition of the invention, the oil is extracted from a hybrid plant produced from *Nepeta racemosa, Esholtia splendens, Cedrelopsis grevei,* and *Lippia graveolens*. The hybrid plant can be produced by known methods, but in one embodiment is produced by simple known crossing over techniques.

2. Extraction of Organic Phenolic Compounds from Plants a. Cultivating the Plant Plants of the Lamiaceae and Verbenacea families are found throughout the world and are relatively easy to cultivate. To cultivate the plants, seeds, in one embodiment, those of plants that are expected to yield a high percentage (e.g., at least about 70 wt %, more preferably at least about 80 wt %), of organic phenolic compounds, are planted in fine loose soil, preferably in a sub-tropical climate. Hybrid seeds having a high percentage of organic phenolic compounds can be produced by known techniques. Crossing *Nepeta racemosa, Esholtia splendens, Cedrelopsis grevei,* and *Lippia graveolens* produces one such hybrid that is a source of the organic phenolic compounds in one embodiment of the invention. The seeds are then cultivated using known agricultural techniques, such as watering, and artificial fertilizing. In one embodiment, the plants are cultivated and grown without the use of any synthetic pesticides.

Because the leaves contain a high amount of oil upon blossoming, it is preferred that the plants be harvested soon after the plants begin to blossom. In one embodiment, the plants are harvested within 24 hours after blossoming, in another embodiment, within 12 hours after blossoming. In yet another embodiment, harvesting is undertaken early in the morning or late in the evening hours (after blossoming begins) when the leaves are not exposed to the sun.

Because the majority of the oil is found in the leaves and blossoms of the plant, in one embodiment of the invention only the leaves and blossoms are utilized in the extraction process. Use of other parts of the plant may increase impurities and decrease yield, but may be utilized in some embodiments of the invention.

b. Extracting Oil from the Plant

Oil containing organic phenolic compounds can be extracted from either dried or fresh plants, or a combination of both. If the plant is dried, in one embodiment, the drying process is undertaken in special drying houses that are constructed to allow for constant, free circulation of air. In another embodiment, the harvested leaves and blossoms are not exposed to direct sunlight, as exposure to sunlight may reduce the amount of active material present in the leaves.

To dry the product, the leaves and blossoms are arranged in 20-25 cm thick layers. To promote uniform drying, the layers should be turned up-side-down either manually or mechanically four times a day during the first three days of drying. Generally, the leaves are dried for about 7 to 8 days. After the leaves and blossoms are dried, the oil can be extracted by known methods, including distillation methods such as steam distillation.

In one embodiment of the invention, the oil is extracted in a two stage distillation process (double distillation). In another embodiment, the oil is first extracted by steam distillation (at a temperature of about 100° C.) to remove most impurities. Typically, after the first steam distillation, the extracted oil contains about 3% to about 4% by weight thymol; about 60% to about 70% carvacrol and about 26% to about 37% by weight impurities.

The steam-distilled oil is then distilled again at a temperature between about 180° C. to about 200° C. to remove additional impurities. In yet another embodiment, the redistilled oil is distilled yet again (a double re-distillation). If a double re-distillation process is used, the oil typically has a purity of greater than 90%, more preferably greater than 95%, and most preferably to 99%. Although yield tends to be lower when a double re-distillation process is used, typically about 1 to 10 kilograms, more typically about 3 to 7 kilograms of oil, are obtained for every 100 kilograms of dried leaves and blossoms.

In a steam distillation process, the distillation column generally has two output tubes: one for oil (at the base of the column) and one for water vapor (at the top of the column). A water source is positioned under the leaves and blossoms and is heated to about 100° C. preferably under a pressure of about 20 bar to about 25 bar (increased pressure will tend to reduce the distillation time). The steam passes through the leaves and blossoms, thereby creating oil droplets. Because the water vapor is lighter than the oil droplets, the water droplets flow out of the output tube positioned at the top of the distillation column and the oil droplets flow out of the output tube positioned at the base of the distillation column. The distillation process is carried out for about 1 to about 5 hours, more typically about 2 to about 3 hours.

In one embodiment of the invention, distillation of plant oils results in separation of isopropyl cresol and isopropyl-o-cresol from aromatic polyphenolic compounds. In one embodiment of the invention, these aromatic polyphenolic compound are added to a composition of the invention. Examples of such aromatic polyphenolic compounds include but are not limited to pimen, cimen, linalool, and barneol. Alternatively, these aromatic polyphenolic compounds may be separately obtained by either extraction or synthesis, and added to a composition of the invention. It is thought, but not relied upon, that the aromatic polyphenolic compounds may improve the appetite of an animal they are fed to.

3. Synthetic Production of Organic Phenolic Compounds

Organic phenolic compounds used in the invention can alternatively be prepared by synthetic methods. Methods for synthetically producing organic phenolic compounds such as carvacrol and thymol are known. See for example *Organic Chemistry* by Morrison & Boyd, 2d ed. 1971 at page 815. Additionally, these compounds are available from chemical manufacturers and are listed in the Merck Index. Although the organic phenolic compounds may be synthetically produced as mentioned above, in one embodiment the compounds are extracted from plants. Because phenol is used to synthesize isopropyl-o-cresol and isopropyl-cresol, the resulting product tends to contain residual phenol (less than 1%). It is generally undesirable to administer a composition containing phenol to an animal because phenol can be mutagenic and carcinogenic.

4. Group II Salt

The organic phenolic compound is combined with a salt, in one embodiment of the invention, a Group II salt. A Group II salt refers to an ionic molecule that has as its cation one of the elements in Group II of the periodic chart of elements (Beryllium (Be), Magnesium (Mg), Calcium (Ca), Strontium (Sr), Barium (Ba), or Ruthenium (Ru)). Group II salts as used herein include any Group II cation in combination with any anion. Examples of Group II salts include for example Group II chlorides, Group II hydroxides, and Group II carbonates. In one embodiment Group II salts include Group II carbonates, in another embodiment the Group II salt is calcium carbonate.

In one embodiment, the Group II salt is combined with the organic phenolic compound to form a reacted organic phenolic compound that includes two deprotonated organic phenolic compounds associated with the Group II cation.

Specific exemplary methods of forming these compounds of the invention are provided below. The Group II salts can be combined with the organic phenolic compounds in a molar ratio of about two (2) moles organic phenolic compound to one (1) mole Group II salt. In one embodiment, the Group II salt is calcium carbonate, in this instance, the calcium carbonate is combined with the organic phenolic compound in ratios (by weight of the total composition) in the range of about 50 wt % to about 90 wt % organic phenolic compound to about 10 wt % to about 50 wt % Group II salt. In another embodiment, the ratio of organic phenolic compound to Group II salt is within the range of about 60 wt % to about 90 wt % organic phenolic compound to about 10 wt % to about 40 wt % Group II salt. In yet another embodiment, the ratio of organic phenolic compound to Group II salt is about 70 wt % to about 80 wt % organic phenolic compound to about 20 wt % to about 30 wt % Group II salt. In even yet another embodiment, about 75 wt % organic phenolic compound is combined with about 25 wt % Group II salt.

5. Reaction to form Organic Phenolic Active Compound

An "active compound" may refer to a compound formed by chemically reacting isopropyl-o-cresol or isopropyl-cresol with a Group II salt, such as calcium carbonate. The active compound products of the reaction of isopropyl cresol, and isopropyl-o-cresol with calcium carbonate are shown below.

Calcium isopropyl cresol

Calcium isopropyl-o-cresol

As used herein, the term "reacting" refers to a process in which the organic phenolic compound is chemically modified (as compared to the formation of a solution). In the formation of an active compound with a Group II salt, the reaction of the organic phenolic compound involves deprotonation of the alcohol moieties on two organic phenolic compounds to form aryl oxide anions which then associate with the Group II cation in solution.

The reaction can be made to take place by known methods, including but not limited to stirring, heating, refluxing, or modification of the pressure. In one embodiment, the reaction is undertaken in a high speed mixer under pressure. In one embodiment, the pressure in the mixer can range from about 2 atm to about 4 atm, specifically about 3 atm (70 kilopounds/m$^2$).

In one embodiment, the solid reacted active compound may be purified, for example, by recrystallization. In purification by recrystallization, a solvent is selected in which the compound is soluble at higher temperatures, but only slightly soluble at lower temperatures, so that the compound will pass from solution to precipitate at a lower temperature while impurities remain in solution.

For example, the active compound can be combined with ethanol to produce a suspension. The suspension is then heated until it boils. Ethanol is added dropwise to the heated suspension until the reacted active compound is completely dissolved. The mixture is then cooled to precipitate the purified active compound. Generally, pure active compound will precipitate at a lower temperature than impurities.

The active compound can also be purified by certain chromatographic methods, including but not limited to solid-liquid, liquid-liquid, and gas-liquid type chromatography. Examples of solid-liquid type chromatographic methods that could be utilized include column chromatography, gel chromatography, dry-column chromatography, or high performance liquid chromatography (HPLC).

In one embodiment of the invention, two or more organic phenolic active compounds are combined. For example, one or more different organic phenolic compounds that have been reacted with a Group II salt can be combined with one or more different organic phenolic compounds that have been reacted with a Group II salt. In another embodiment, one or more organic phenolic compounds that have been reacted with a Group II salt can be combined with one or more organic phenolic compounds that have been reacted with a different Group II salt. For example, an active compound obtained by reacting calcium carbonate with isopropyl-o-cresol can be mixed with an active compound obtained by reacting calcium carbonate with isopropyl cresol.

In one embodiment, reacted isopropyl-o-cresol and reacted isopropyl-cresol are combined to form a mixture. In another embodiment, the mixture contains more isopropyl-o-cresol active compound than isopropyl-cresol active compound. For example, the mixture can contain between about 1 wt % to about 45 wt % of the weight of the total mixture of the active compound isopropyl cresol active compound and between about 55 wt % and about 99 wt % of the weight of the total mixture of the active compound isopropyl-o-cresol active compound; in another embodiment between about 1 wt % to about 25 wt % of the weight of the total mixture of the active compound isopropyl cresol active compound and between about 75 wt % and about 99 wt % of the weight of the total mixture of the active compound isopropyl-o-cresol active compound; in yet another embodiment between about 1 wt % to about 10 wt % of the weight of the total mixture of the active compound isopropyl cresol active compound and between about 90 wt % and about 99 wt % of the weight of the total mixture of the active compound isopropyl-o-cresol active compound; in even yet another embodiment between about 1 wt % to about 5 wt % of the weight of the total mixture of the active compound isopropyl cresol active compound and between about 95 wt % and about 99 wt % of the weight of the total mixture of the active compound isopropyl-o-cresol active compound. In a further embodiment, a mixture is obtained by mixing 5 wt % isopropyl cresol active compound with 95 wt % isopropyl-o-cresol active compound. Again, mixing can be carried out by any method known to those of skill in the art, including but not limited to mixing at 150 revolutions per minute for at least 5 minutes to produce a homogenous mixture.

B. Lactic Acid

The term active compound can also include lactic acid, $C_3H_6O_3$, the structure of which can be seen below.

Lactic Acid

Lactic acid is a solid with a melting point of 16.8° C. Lactic acid can be prepared technically by "lactic acid fermentation" of carbohydrates such as glucose, sucrose, and lactose with *Bacillus acidi lacti* or related organisms such as *Lactobacillus delbrueckii*, and *L. bulgaricus*. This fermentation is generally carried out at relatively high temperatures. Lactic acid can also be produced commercially by fermentation of whey, cornstarch, potatoes, or molasses.

Lactic acid is thought to function in compositions of the invention as a bactericide. It can be used in combinations with the base reacted active compounds of the invention.

In embodiments of the invention including lactic acid in the active compound, the lactic acid is about 10 wt % to about 90 wt % of the weight of the active compound. In yet another embodiment, the lactic acid is about 30 wt % to about 70 wt % of the weight of the active compound. In even yet another embodiment, the lactic acid is about 40 wt % to about 60 wt % of the weight of the active compound. A further embodiment has about 50 wt % of the weight of the active compound of lactic acid.

II. Compositions

As used herein, the term "composition" refers to a composition which includes at least one active compound and a buffering agent. Alternatively, a "composition" can contain other components including but not limited to one or more carriers. For example, the term "composition" can refer to a combination of one or more reacted organic phenolic compounds, one or more buffering agents, and one or more carriers. This definition of "composition" includes essential oils obtained from plants as well as synthetically produced organic phenolic compounds combined with acceptable buffering agents, and carriers.

A. Active Compounds

In one embodiment of the invention, a composition of the invention includes one or more active compounds (e.g., calcium isopropyl-o-cresol, calcium isopropyl-o-cresol, or lactic acid), or combinations thereof. In one embodiment, the total amount of active compound makes up about 0.1 wt % to about 15 wt % of the total weight of the composition. In another embodiment the total amount of active compound makes up about 0.5 wt % to about 12 wt % of the total weight of the composition. In an embodiment of the invention which has only organic phenolic active compounds, the total amount of active compounds makes up about 4 wt % to about 6 wt % of the total weight of the composition, and in another embodiment about 5 wt % of the total weight of the composition.

In an embodiment of the invention which has organic phenolic active compounds and lactic acid compounds, the total amount of active compounds makes up about 8 wt % to about 12 wt % of the total weight of the composition, and in another embodiment about 10 wt % of the total weight of the composition.

B. Buffering Agents

In one embodiment of the invention a buffering agent can enhance the digestive functioning of the animal and can aid in counteracting the effects of heat stress. Compositions of the invention may also include at least one buffering agent. Buffering agents function to buffer the stomachs of the animals that consume the buffering agent. In cows, a buffering agent functions to aid in digestion of fiber in the cow's diet. A dairy cow has a complex acid-base regulatory system with the pH of the rumen generally varying from about 5.5 to 6.8. If the pH of the rumen is not optimal, microbial yield and efficiency drops, dry matter intake declines, and metabolic disorders can increase. In one embodiment, a rumen buffering agent ties up hydrogen ions near the desired rumen pH.

In one embodiment of the invention, the buffering agent used is calcium carbonate ($CaCO_3$). Calcium carbonate can be obtained from limestone sources. Limestone can be deposited by cold water or hot water. The cold water deposited calcium carbonate is a grayish material that is very hard and dense. Generally, cold water deposited calcium carbonate has a slow reaction time. Hot water deposited calcium carbonate is a white, soft material with a fast reaction time.

Reaction time of a buffering agent can be determined by a number of known methods. One example of such a method follows. Five hundred (500) mL of distilled $H_2O$ is measured into a beaker equipped with a stirrer (alternatively, a blender can also be used). A precisely weighed 1.00 gram sample of the buffering agent is added, and the solution is stirred. At the same time, a pH meter is inserted into the solution. 2.3 mL of glacial acetic acid is quickly injected, and a timer is started.

The pH of the solution is monitored until it reaches 4.1. The time it takes the solution to reach this pH is one measurement of the reaction time.

It is thought, but not relied upon, that a reaction time of 120 to 140 seconds allows a buffering agent (calcium carbonate for example) to buffer all of the stomachs of a cow. Buffering of the stomachs is important for full utilization of the feed before it passes through the cow. In one embodiment of the invention, the calcium carbonate utilized as the buffering agent has a reaction time of about 120 to about 140 seconds. In another embodiment, the calcium carbonate used has a reaction time of about 130 to about 140 seconds. In yet another embodiment, the calcium carbonate has a reaction time of about 135 to about 140 seconds, specifically, about 136 seconds.

In one embodiment, compositions of the invention include about 40 wt % to about 75 wt % buffering agent based on the total weight of the composition. In another embodiment, compositions of the invention include about 50 wt % to about 65 wt % of the total weight of the composition. In yet another embodiment that includes both organic phenolic compounds and lactic acid as active compounds, the buffering agent is about 55 wt % of the total weight of the composition. In an embodiment of the invention having only organic phenolic compounds as the active compounds, the buffering agent is about 60 wt % of the total weight of the composition.

C. Carriers

Compositions of the invention may, but need not include a carrier. Carriers used in compositions of the invention can function to give desired characteristics to the compositions of the invention. Examples of such desired characteristics include but are not limited to flowability of the composition, texture of the composition, or stability of the composition.

Any materials that can impart these desired characteristics, and are not detrimental to the animal may be utilized if desired, as carriers in compositions of the invention. In one embodiment of the invention materials that can be used as carriers include but are not limited to cornstarch and silicon dioxide.

In one embodiment of a composition of the invention, the carrier is about 10 wt % to about 60 wt % of the total weight of the composition. In yet another embodiment, the carrier is about 25 wt % to about 45 wt % of the total weight of the composition. In yet another embodiment, the carrier is about 30 wt % to about 40 wt % of the weight of the total composition. In a further embodiment, the carrier is about 35 wt % of the total weight of the composition.

In one embodiment of a composition of the invention, the carrier includes both corn starch and silicon dioxide. In this embodiment, the silicon dioxide is about 5 wt % to about 20 wt % of the weight of the carrier and the corn starch is about 80 wt % to about 95 wt % of the weight of the carrier. In another embodiment, the silicon dioxide is about 7.5 wt % to about 17.5 wt % of the weight of the carrier and the corn starch is about 82.5 wt % to about 92.5 wt % of the weight of the carrier. In yet another embodiment, the silicon dioxide is about 10 wt % to about 15 wt % of the total weight of the carrier, and the corn starch is about 85 wt % to about 90 wt % of the carrier. In a further embodiment, the silicon dioxide is about 14 wt %, and the corn starch is about 86 wt % of the carrier (also illustrated as the silicon dioxide being about 5 wt % of the total weight of the composition and the corn starch being about 30 wt % of the total weight of the composition).

D. Illustrative Compositions

An illustrative formulation of a composition of the invention for administration to cows, sheep, and goats is illustrated below.

| Ingredient | Weight Percent |
| --- | --- |
| Calcium Isopropyl cresol | 0.25 |
| Calcium Isopropyl-o-cresol | 4.75 |
| Calcium Carbonate | 60.0 |
| Silicon Dioxide | 5.0 |
| Corn Starch | 30.0 |
| | 100. |

An illustrative formulation of a composition of the invention for administration to mares and sows is illustrated below.

| Ingredient | Weight Percent |
| --- | --- |
| Calcium Isopropyl cresol | 0.25 |
| Calcium Isopropyl-o-cresol | 4.75 |
| Lactic Acid | 5.0 |
| Calcium Carbonate | 55.0 |
| Silicon Dioxide | 5.0 |
| Corn Starch | 30.0 |
| | 100. |

E. Dosage and Administration

In one embodiment of the invention, compositions of the invention are mixed with feed. Dosage amounts for compositions of the invention range from about 500 parts per million (ppm) to about 2500 ppm. In one embodiment, dosage amounts for compositions of the invention range from about 750 ppm to about 1500 ppm. In another embodiment, dosage amounts for compositions of the invention range from about 900 ppm to about 1100 ppm, and yet another embodiment has a dosage amount of about 1000 ppm.

In an embodiment where the composition is being administered to animals that are being used for milk production, a composition of the invention is administered to the animals permanently. In embodiments where animals are feeding their own young the milk, a composition of the invention is administered to the animals only during the suckling period of the young animals. For example, in one embodiment of the invention used for milk production in mares, a composition of the invention is administered from (age of young animal) day 1 until day 180 (for approximately 6 months). In another embodiment of the invention used for increasing milk production in sows, a composition of the invention is administered two weeks before delivery of the piglets and for 14 days thereafter.

WORKING EXAMPLES

Example 1

Extraction of Isopropyl-1-cresol and Isopropyl Cresol from *Nepeta cataria*

Isopropyl-o-cresol and isopropyl-cresol were extracted from *Nepeta cataria* using a two stage distillation process. In the first stage, dried leaves were extracted using a steam distillation process. After the distillation, the oil is cooled to room temperature for at least 72 hours.

The oil from the steam distillation process was then re-distilled in a second stage distillation process. In the re-distillation, the oil was heated to a temperature of about 186° C. for about 1 hour to remove remaining impurities such as linalool, barneol, pimen, cimen etc. Generally, the impurities have a boiling point of about 150° C. In contrast, both isopropyl-o-cresol and isopropyl-cresol have a boiling point of about 230° C. to 240° C. Thus, a temperature of 180° C. will typically not remove or damage the organic phenolic products.

The oil is again allowed to cool for at least 72 hours to stabilize the oil.

After the oil is cooled, the redistillation is repeated at a temperature of 180° C. for 30 minutes to eliminate almost all of the remaining impurities. The double re-distillation process produced an oil having a purity between 95% and 98%.

After the second re-distillation the oil was allowed to cool for at least 72 hours before production.

Example 2

Separation of Isopropyl-o-cresol from Isopropyl-cresol

Isopropyl-o-cresol and isopropyl-cresol were separated by incubating the distilled oil at a temperature of −25° C. for 6 hours. Isopropyl-o-cresol remains as a liquid and isopropyl-cresol is precipitated out as crystals. The two compounds were then separated via filtration.

Example 3

Preparation of a Composition of the Invention for Cows, Sheep, or Goats

Isopropyl cresol and isopropyl-o-cresol were produced using the method of examples 1 and 2 above. Polyphenolic compounds were also produced during the distillation and separated out. The isopropyl cresol was then combined in a 2:1 molar ratio with calcium carbonate from a hot water deposited limestone. This mixture was combined in an atomizer under vacuum-pressure to create the calcium isopropyl cresol active compound. The isopropyl-o-cresol was then combined in a 2:1 molar ratio with calcium carbonate from a hot water deposited limestone. This mixture was combined in an atomizer under vacuum-pressure to create the calcium isopropyl-o-cresol active compound. Calcium isopropyl cresol was combined with calcium isopropyl-o-cresol in a 95:5 weight ratio and mixed.

A composition was then formed from 5 wt % of the calcium isopropyl cresol/calcium isopropyl-o-cresol mixture, 60 wt % calcium carbonate from a hot water deposited limestone, 5 wt % silicon dioxide, and 30 wt % corn starch. To this composition was readded the polyphenolic compounds from the distillation of the plant essential oils.

Example 4

Preparation of a Composition of the Invention for Mares and Sows

Isopropyl cresol and isopropyl-o-cresol were produced using the method of examples 1 and 2 above. Polyphenolic compounds were also produced during the distillation and separated out. The isopropyl cresol was then combined in a 2:1 molar ratio with calcium carbonate from a hot water deposited limestone. This mixture was combined in an atomizer under vacuum-pressure to create the calcium isopropyl cresol active compound. The isopropyl-o-cresol was then combined in a 2:1 molar ratio with calcium carbonate from a hot water deposited limestone. This mixture was combined in an atomizer under vacuum-pressure to create the calcium isopropyl-o-cresol active compound. Calcium isopropyl cresol was combined with calcium isopropyl-o-cresol in a 95:5 weight ratio and mixed.

5 wt % of the calcium isopropyl cresol/calcium isopropyl-o-cresol mixture was then added to 5 wt % lactic acid, followed by 55 wt % calcium carbonate from a hot water deposited limestone, 5 wt % silicon dioxide, and 30 wt % corn starch.

Example 5

Use of a Composition of the Invention on Cows

One hundred (100) milk cows that would normally have a decreased feed intake and milk production due to heat stress were administered a composition of the invention according to Example 3 beginning in the first part of June.

Within four weeks of beginning treatment, the Total Mix Ration (feed amount) was increased by 1300 pounds (590 kg).

Example 6

Use of a Composition of the Invention on Cows

A herd of 116 cows were administered a composition of the invention according to Example 3. This herd was compared with a 127 cow herd without administration of a compound of the invention. The comparison was carried out in June.

The herd being administered the composition of the invention had an increased intake of food and an increased level of milk production compared to a decreased intake of food and a decreased level of milk production in the herd without administration of the composition.

Example 7

Use of a Composition of the Invention on Cows

Twenty (20) cows in a 100 cow herd had a previously uncured Salmonella outbreak. The cows were fed a composition of the invention according to Example 3.

Within 2 days of beginning treatment, the diarrhea caused by the Salmonella was gone, and the cows were back to their pre-outbreak level of milk production in 7 to 10 days.

Example 8

Use of a Composition of the Invention on Cows

A composition of the invention according to Example 3 was administered to 67 cows and it doubled the rate of milk production and had positive effects on winter dysentery.

Example 9

Use of a Composition of the Invention on Cows

A composition of the invention according to Example 3 was administered to 120 cows. The milk production of the cows increased 4 pounds (8.8 kg) per cow per day and the herd was in an overall better condition.

Example 10

Use of a Composition of the Invention on Cows

A dairy herd with 90 cows was given a composition of the invention according to Example 3. Another dairy herd (owned by the same individual) with 50 cows was not given a composition of the invention.

The herd being administered the composition of the invention had an increased milk production of 2 to 3 pounds (4.4 to 6.6 kg) per cow per day, stronger heats, and had no winter dysentery problems. The herd without the composition of the invention had a milk production that was decreased from normal, weaker heats, and the entire herd was afflicted with winter dysentery.

Example 11

Use of a Composition of the Invention on Cows

A herd of 2500 cows was treated for 30 days with a composition of the invention according to Example 3. The consumption of feed increased an average of 1.5 pounds (3.3 kg) per cow per day. The milk production increased an average of 3 pounds (6.6 kg) per cow per day within 12 days of administering the composition.

After 30 days, the administration of the composition of the invention was ceased, and within 48 hours, there was an average of a 3 pound (6.6 kg) drop in milk production.

Example 12

Use of a Composition of the Invention on Cows

A 123 cow herd was treated for 7 days with a composition of the invention according to Example 3. The 10 days prior to the treatment, there was an average of 51.12 pounds (113 kg) of milk having 3.91% butter fat, 3.01% protein, and a Somatic cell count of 231. The seventh day after beginning treatment with the composition of the invention, there was 52.24 pounds (115 kg) of milk with 4.04% butter fat, 3.13% protein, and a Somatic cell count of 211.

Example 13

Use of a Composition of the Invention on Cows

A herd of 70 cows were administered a composition of the invention according to Example 3 for three weeks (Nov. 29-Dec. 18).

There was an average increase of milk production of 4.3 pounds (9.5 kg) per cow per day. The solids in the milk increased, and the butter fat and the protein were stable.

Example 14

Use of a Composition of the Invention on Cows

An 80 cow herd was administered a composition of the invention according to Example 3 for two weeks.

The cows had an average of a 1 to 1½ pound (2.2 to 3.3 kg) per cow per day increase in milk production. The milk had an increased butter fat and protein amount and had a decreased Somatic cell count. The cattle also seemed to be walking better, and had a better appetite.

Example 15

Use of a Composition of the Invention on Cows

A 100 cow dairy herd was monitored for 60 days (Jun. 1, 2001 to Jul. 27, 2001) while being administered a composition of the invention according to Example 3. The average daily temperature was also noted for those days.

Figure 1:
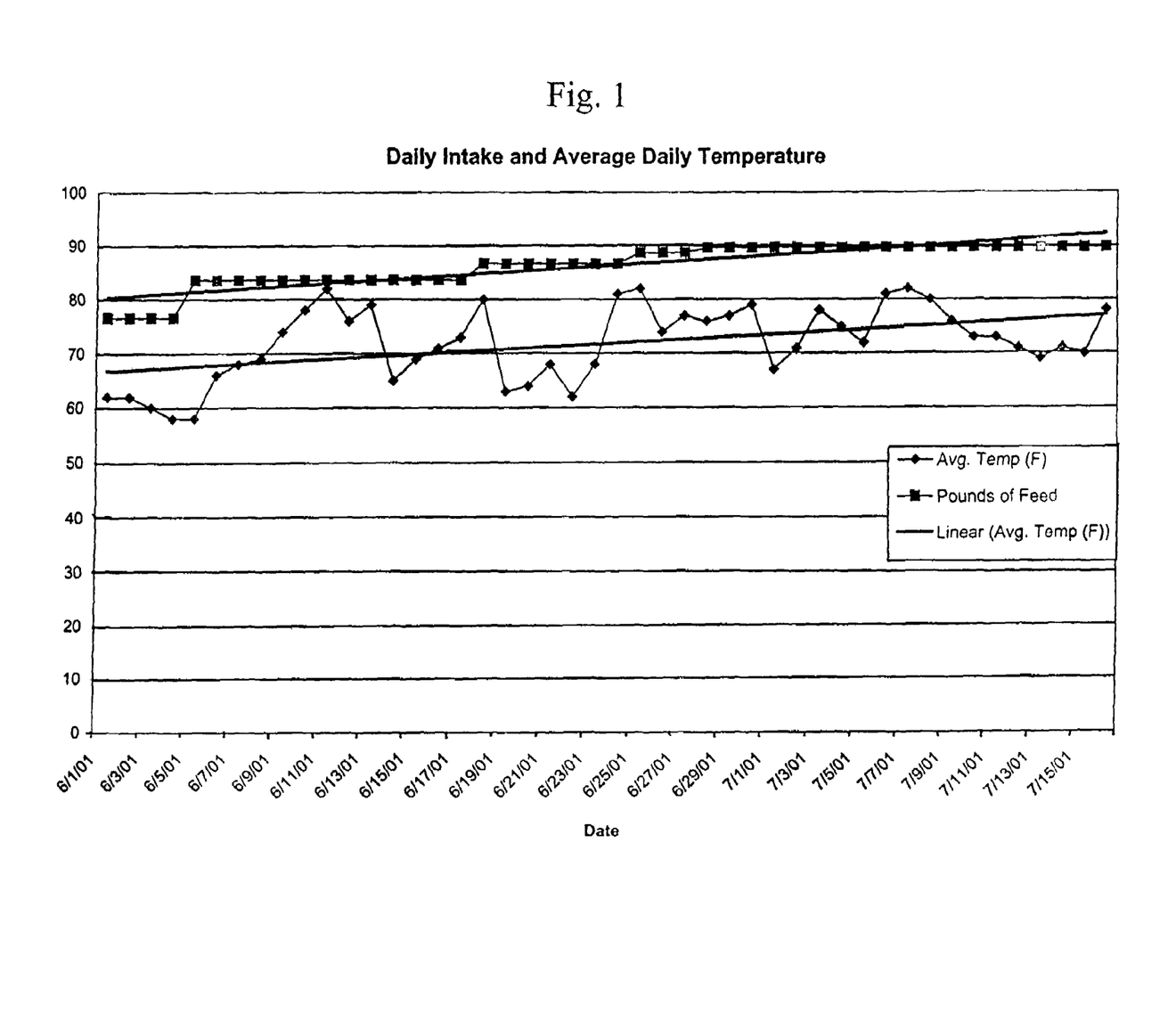
FIG. 1 illustrates the pounds of daily food intake of a dairy herd and the corresponding average daily temperature.

FIG. 1 shows a graph of the average daily temperature in degrees Fahrenheit and the amount of feed consumed by the animals over the 60 day period.

Example 16

Effect of A Composition of the Invention on Feed

A composition of the invention according to Example 3 above was added at the rate of 0.16 grams per 0.55 kg (0.25 lbs) of feed. This amount would correlate to 0.22 kg (0.10 lbs) of the composition per cow per day.

The treated feed was monitored for molds, and the molds were identified and counted. The following results were obtained with a without addition of a composition of the invention.

TABLE 1

| Type of Mold | Amount of specified mold in 0.55 kg of feed without a composition of the invention | Amount of specified mold in 0.55 kg feed with a composition of the invention |
|---|---|---|
| Mucor sp. | 10,000 | 100 |
| Penicillum sp. | 200 | 0 |
| Yeast Count | 17,989,800 | 8,999,900 |
| Total Count | 18,000,000 | 9,000,000 |

These results show that compositions of the invention may also have antioxidant properties. These properties help maintain the condition or "freshness" of the feed keeping it palatable to the animal for a longer period of time.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A composition for increasing milk production in an animal comprising:
   (a) a mixture of calcium isopropyl cresol, calcium isopropyl-o-cresol and lactic acid; and
   (b) calcium carbonate as a buffering agent.

2. The composition of claim 1, wherein said calcium isopropyl cresol and calcium isopropyl-o-cresol are present in a weight ratio of about 1:99 to about 45:55.

3. The composition of claim 2, wherein said calcium isopropyl cresol and calcium isopropyl-o-cresol are present in a weight ratio of about 1:99 to about 10:90.

4. The composition of claim 3, wherein said calcium isopropyl cresol and calcium isopropyl-o-cresol are present in a weight ratio of about 5:95.

5. The composition of claim 1, wherein said mixture is about 0.1 wt % to about 15 wt % of the total weight of said composition.

6. The composition of claim 5, wherein said mixture is about 0.5 wt % to about 12 wt % of the total weight of said composition.

7. The composition of claim 6, wherein said mixture is about 4 wt % to about 6 wt % of the total weight of said composition.

8. The composition of claim 7, wherein said mixture is about 5 wt % of the total weight of said composition.

9. The composition of claim 5, wherein said mixture is about 8 wt % to about 12 wt % of the total weight of said composition.

10. The composition of claim 9, wherein said mixture is about 10 wt % of the total weight of said composition.

11. The composition of claim 1, wherein said calcium carbonate is hot water deposited.

12. The composition of claim 1, wherein said buffering agent is about 40 wt % to about 75 wt % of the total weight of said composition.

13. The composition of claim 12, wherein said buffering agent is about 50 wt % to about 65 wt % of the total weight of said composition.

14. The composition of claim 1, further comprising a carrier.

15. The composition of claim 14, wherein said carrier is chosen from the group consisting of silicon dioxide, and corn starch.

16. The composition of claim 1, wherein said animal is chosen from the group consisting of cows, sheep, and goats.

17. The composition of claim 1, wherein said animal is chosen from the group consisting of mares and sows.

18. The composition of claim 1, wherein said composition is mixed with food for said animal.

19. The composition of claim 18, wherein said composition is mixed with food at a concentration of from about 500 ppm to about 2500 ppm.

20. The composition of claim 19, wherein said composition is mixed with food at a concentration of about 1000 ppm.

21. The composition of claim 1, further comprising at least two aromatic polyphenolic compounds.

22. The composition of claim 21, wherein said aromatic polyphenolic compounds are obtained from a plant extract.

23. The composition of claim 22, wherein said plant extract also provides an organic phenolic compound.

24. The composition of claim 21, wherein said aromatic polyphenolic compound is chosen from the group consisting of pimen, cimen, linalool, bameol, and combinations thereof.

25. A composition for increasing milk production in an animal comprising:

(a) about 0.05 wt % to about 0.5 wt % of the total weight of said composition of calcium isopropyl cresol;
(b) about 4.5 wt % to about 4.95 wt % of the total weight of said composition of calcium isopropyl-o-cresol;
(c) about 1.75 wt % to about 7 wt % of the total weight of said composition of silicon dioxide; (d) about 28 wt % to about 33.25 wt % of the total weight of said composition of corn starch; and (e) about 55 wt % to about 60 wt % of the total weight of said composition of calcium carbonate.

26. The composition of claim 25, further comprising at least one aromatic polyphenolic compound.

27. A composition for increasing milk production in an animal comprising:

(a) about 0.05 wt % to about 0.5 wt % of the total weight of said composition of calcium isopropyl cresol;
(b) about 4.5 wt % to about 4.95 wt % of the total weight of said composition of calcium isopropyl-o-cresol;
(c) about 3 wt % to about 7 wt % of the total weight of said composition of lactic acid (c) about 1.75 wt % to about 7 wt % of the total weight of said composition of silicon dioxide;
(d) about 28 wt % to about 33.25 wt % of the total weight of said composition of corn starch; and
(e) about 50 wt % to about 55 wt % of the total weight of said composition of calcium carbonate.

28. The composition of claim 27, further comprising at least one aromatic polyphenolic compound.

* * * * *